United States Patent

Hoshi et al.

[11] Patent Number: 5,943,166
[45] Date of Patent: *Aug. 24, 1999

[54] STEREOSCOPIC IMAGE DISPLAY APPARATUS INCLUDING A PARALLAX BARRIER AND AN OPTICAL ELEMENT INCLUDING DIFFRACTION MEANS

[75] Inventors: Hiroaki Hoshi, Yokohama; Naosato Taniguchi, Urawa; Toshiyuki Sudo, Kawasaki; Hideki Morishima, Kawasaki; Kazutaka Inoguchi, Kawasaki, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/672,935

[22] Filed: Jun. 28, 1996

[30] Foreign Application Priority Data

Jul. 3, 1995 [JP] Japan .................................. 7-167380

[51] Int. Cl.$^6$ ........................... G02B 27/22; G02F 1/1335
[52] U.S. Cl. .............................. 359/475; 359/464; 349/64
[58] Field of Search ...................................... 359/462–466, 359/475, 15, 19, 565, 566, 567, 571, 599; 349/64, 66; 352/58; 353/7; 348/51, 54

[56] References Cited

U.S. PATENT DOCUMENTS

| | | | |
|---|---|---|---|
| 1,561,149 | 11/1925 | Gage | 359/565 |
| 4,704,004 | 11/1987 | Nosker | 349/67 |
| 4,717,949 | 1/1988 | Eichenlaub | 359/463 |
| 4,829,365 | 5/1989 | Eichenlaub | 359/462 |
| 4,927,238 | 5/1990 | Green et al. | 359/462 |
| 5,036,385 | 7/1991 | Eichenlaub | 348/55 |
| 5,260,828 | 11/1993 | Londono et al. | 359/565 |
| 5,392,140 | 2/1995 | Ezra et al. | 349/15 |
| 5,457,574 | 10/1995 | Eichenlaub | 359/463 |
| 5,465,175 | 11/1995 | Woodgate et al. | 359/463 |
| 5,475,419 | 12/1995 | Carbery | 359/464 |
| 5,476,417 | 12/1995 | Nakamura et al. | 349/64 |
| 5,600,455 | 2/1997 | Ishikawa et al. | 349/64 |

FOREIGN PATENT DOCUMENTS

2274414 12/1975 France .................................. 359/462

*Primary Examiner*—Jon Henry
*Attorney, Agent, or Firm*—Morgan & Finnegan, L.L.P.

[57] ABSTRACT

This invention relates to a stereoscopic image display apparatus, which comprises a two-dimensionally array of light modulation elements for modulating light in correspondence with a stripe synthesized image obtained by alternately arranging stripe image portions of a plurality of stripe images which are obtained by dividing right- and left-eye images, an illumination light source, arranged behind the light modulation elements, for illuminating the light modulation element, a parallax barrier arranged in front of the light modulation elements, and having predetermined aperture portions and light-shielding portions in correspondence with the light modulation elements corresponding to the respective stripe image portions, and an element, arranged between the light modulation elements and the illumination light source, for dividing and deflecting light emitted by the illumination light source.

8 Claims, 5 Drawing Sheets

STEREOSCOPIC IMAGE DISPLAY APPARATUS INCLUDING A PARALLAX BARRIER AND AN OPTICAL ELEMENT INCLUDING DIFFRACTION MEANS

BACKGROUND OF THE INVENTION

1. Field of the Invention

The present invention relates to a stereoscopic image display apparatus using a parallax barrier method and, more particularly, to a bright stereoscopic image display apparatus.

2. Related Background Art

A stereoscopic image display method using a parallax barrier method is disclosed in S. H. Kaplan, "Theory of Parallax Barriers", J. SMPTE, Vol. 59, No. 7, pp. 11–21 (1952). With this method, a stripe image formed by alternately arranging right and left image portions of a plurality of parallax images is observed by an observer via a slit array (called a parallax barrier) which is arranged at a position separated by a predetermined distance from the stripe image and has predetermined aperture portions and light-shielding portions, so that the two eyes of the observer can observe the corresponding parallax images, thus attaining stereoscopic viewing.

This stereoscopic image display method is well known as a method that requires no spectacles. However, since this method has the following drawbacks, it is very rare to realize this method as a practical stereoscopic image display apparatus.

In the conventional parallax barrier method, a linear grating-shaped element on which pairs of aperture slits and light-shielding barriers are arranged is used. In order to reduce crosstalk between the right and left parallax images, the light-shielding barrier and the aperture slit preferably have high contrast therebetween. More specifically, the light-shielding barrier preferably has a transmittance closer to 0%, and a light-shielding barrier having a transmittance of 1% or less can be realized by depositing a metal film (e.g., aluminum, chromium, or the like) on a glass substrate. When the duty ratio between the widths of the light-shielding barrier and the aperture slit, in other words, the width of the aperture slit with respect to the grating pitch is defined to be a slit aperture ratio, the slit aperture ratio is normally set to be 50% or less since a large crosstalk reduction effect can be expected as the light-shielding barrier has a larger ratio. By definition of luminance, the slit aperture ratio has no influence on luminance, but the width of the slit is approximately equal to the pixel pitch. For this reason, rather than this microscopic luminance, the average luminance on the entire screen, which corresponds to the brightness perceived by the observer and is normally used in a display apparatus will be examined hereinafter. More specifically, since the light-shielding barrier has substantially zero transmittance, and the slit aperture ratio is 50% or less, the original brightness of the stripe image is lowered to ½ or less in principle in the conventional parallax barrier method.

Furthermore, a viewing region which is determined by the geometric layout and allows stereoscopic viewing is narrow. Since a stereoscopic viewing region and an inverse stereoscopic viewing region are alternatively aligned in the horizontal direction, the observer must move his or her head so as to adjust his or her pupil positions or view points to fall within the stereoscopic viewing range. This problem depends on the widths of the light-shielding barrier and the aperture slit, and a region suffering large crosstalk between parallax images is present between the stereoscopic viewing region and the inverse stereoscopic viewing region.

As described above, in the conventional parallax barrier method, the brightness of an image is lowered to ½ or less due to the presence of the light-shielding barrier, and a dark image is destined to be displayed. This problem worsens when a liquid crystal display apparatus (to be referred to as an LCD hereinafter) is used as a display apparatus. That is, in this case, due to the low aperture ratio (30% to 60%) of pixels of the LCD, a darker image is displayed. For this reason, the luminance and consumption power of a flat backlight light source as an illumination device of the LCD must be increased, and in a notebook type personal computer or a palmtop type personal computer with high portability, it is almost impossible to adopt the parallax barrier method in terms of the service life of a battery.

In order to solve the problem of the narrow viewing region, a stereoscopic display method using a linear array of columnar lenses (called a lenticular method) is widely known as a method of broadening the viewing region. However, since a stripe image is observed via columnar lenses serving as micro phase objects, images in micro regions are distorted due to the lens effect (e.g., astigmatism) of the columnar lenses, resulting in glittering and unnatural feeling. Thus, this method also suffers a problem in terms of its principle, i.e., it is hard to obtain a high-quality image.

SUMMARY OF THE INVENTION

It is an object of the present invention to provide a stereoscopic image display apparatus using a parallax barrier method, which can solve the above-mentioned problems and can easily realize a high-luminance stereoscopic image display operation with low cost.

In order to achieve the above object, according to one aspect of the present invention, there is provided a stereoscopic image display apparatus comprising a two-dimensionally array of light modulation elements for modulating light in correspondence with a stripe synthesized image obtained by alternately arranging stripe image portions of a plurality of stripe images which are obtained by dividing right- and left-eye images, an illumination light source, arranged behind the light modulation elements, for illuminating the light modulation element, a parallax barrier arranged in front of the light modulation elements, and having predetermined aperture portions and light-shielding portions in correspondence with the light modulation elements corresponding to the respective stripe image portions, and an element, arranged between the light modulation elements and the illumination light source, for dividing and deflecting light emitted by the illumination light source.

According to a preferred aspect, the stereoscopic image display apparatus further comprises a linearly array of prisms, located between the illumination light source and the light modulation elements, for improving directivity of the light emitted by the illumination light source.

According to a preferred aspect, the light dividing and deflecting element has an effect of converging divided and deflected light beams.

According to a preferred aspect, the light dividing and deflecting element comprises a diffraction element having concentric grating patterns.

According to a preferred aspect, the stereoscopic image display apparatus further comprises a Fresnel lens located between the illumination light source and the light modulation elements.

According to a preferred aspect, the light dividing and deflecting element comprises a linear diffraction grating which is arranged in a direction parallel to the parallax barrier.

According to a preferred aspect, the light dividing and deflecting element comprises a diffraction element having concentric grating patterns, a center of which is decentered with respect to an optical axis of the Fresnel lens.

According to the arrangement of the present invention, an illumination light beam can be focused on a predetermined viewing range by the diffraction device, thus increasing brightness.

Furthermore, since the illumination light beam is focused on the predetermined region, the diffraction grating can substantially reduce effective crosstalk.

Moreover, the diffraction grating can substantially broaden viewing regions for the right and left eyes.

As described above, the arrangement of the present invention can increase brightness, can broaden the viewing region as a result of reduction of crosstalk, and can improve image quality, thus allowing a stereoscopic display operation with higher quality.

Specific embodiments of the present invention will become apparent from some exemplary embodiments to be described below.

DETAILED DESCRIPTION OF THE PREFERRED EMBODIMENTS (First Embodiment)

Figure 1:
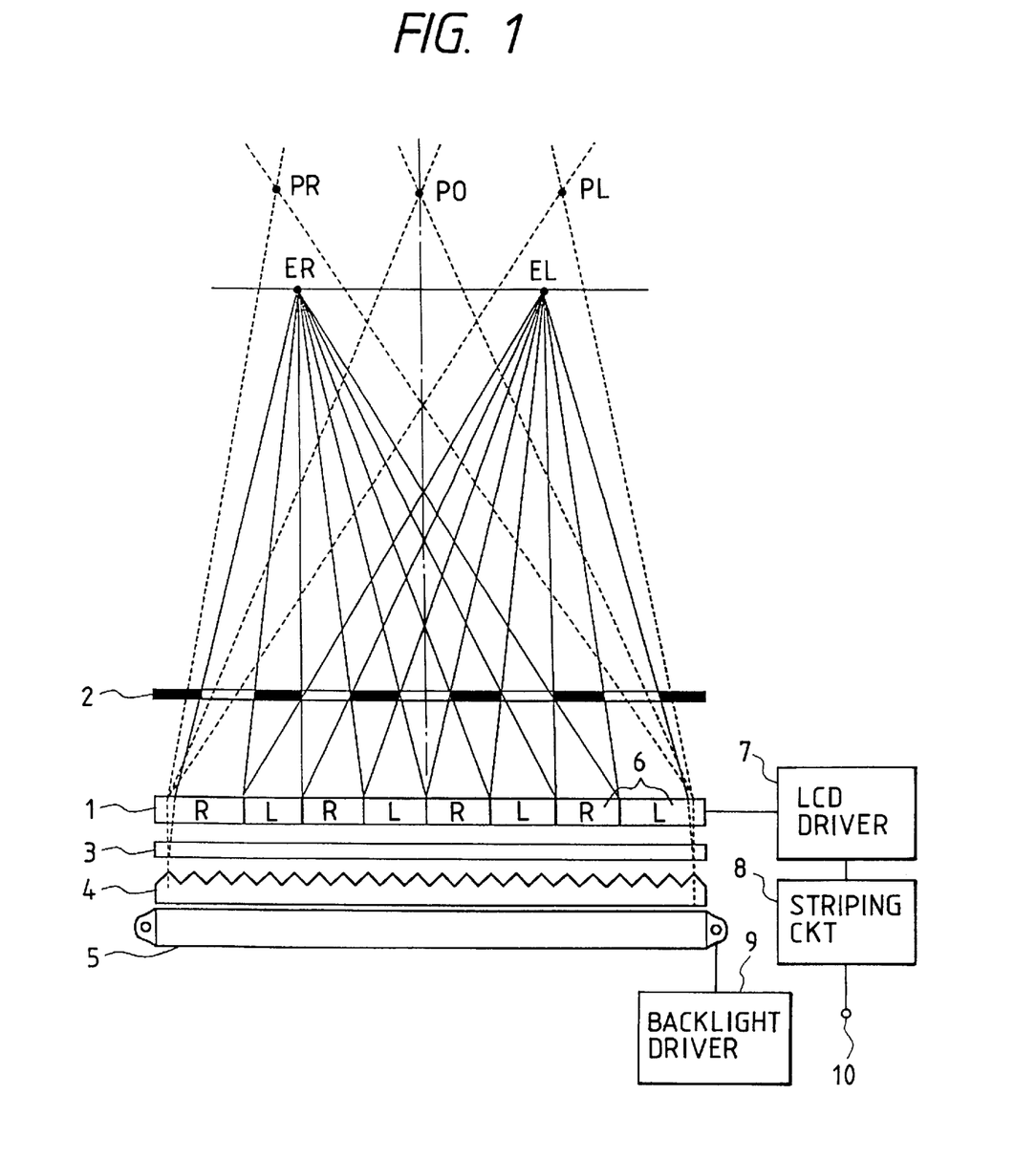
FIG. 1 is a schematic diagram showing a stereoscopic image display apparatus according to the first embodiment of the present invention.

FIG. 1 is a schematic diagram showing a stereoscopic image display apparatus according to the first embodiment of the present invention. Referring to FIG. 1, the apparatus comprises a two-dimensionally arranged transmission type light modulation element array 1 such as an LCD for modulating light in correspondence with an image, and displaying an image including right- and left-eye image portions R and L, as illustrated in a display state 6 in FIG. 1, a parallax barrier 2, a holographic diffraction element 3, an illumination prism sheet 4, an illumination light source (backlight) 5, an LCD driver 7, a striping circuit 8, a backlight driver 9, and an image information input terminal 10. Also, in FIG. 1, ER and EL respectively represent the right and left eyes of an observer, PO, PR, and PL respectively represent the imaginary focal points of illumination light beams, and dotted lines indicate the illumination light beams.

Figure 2:
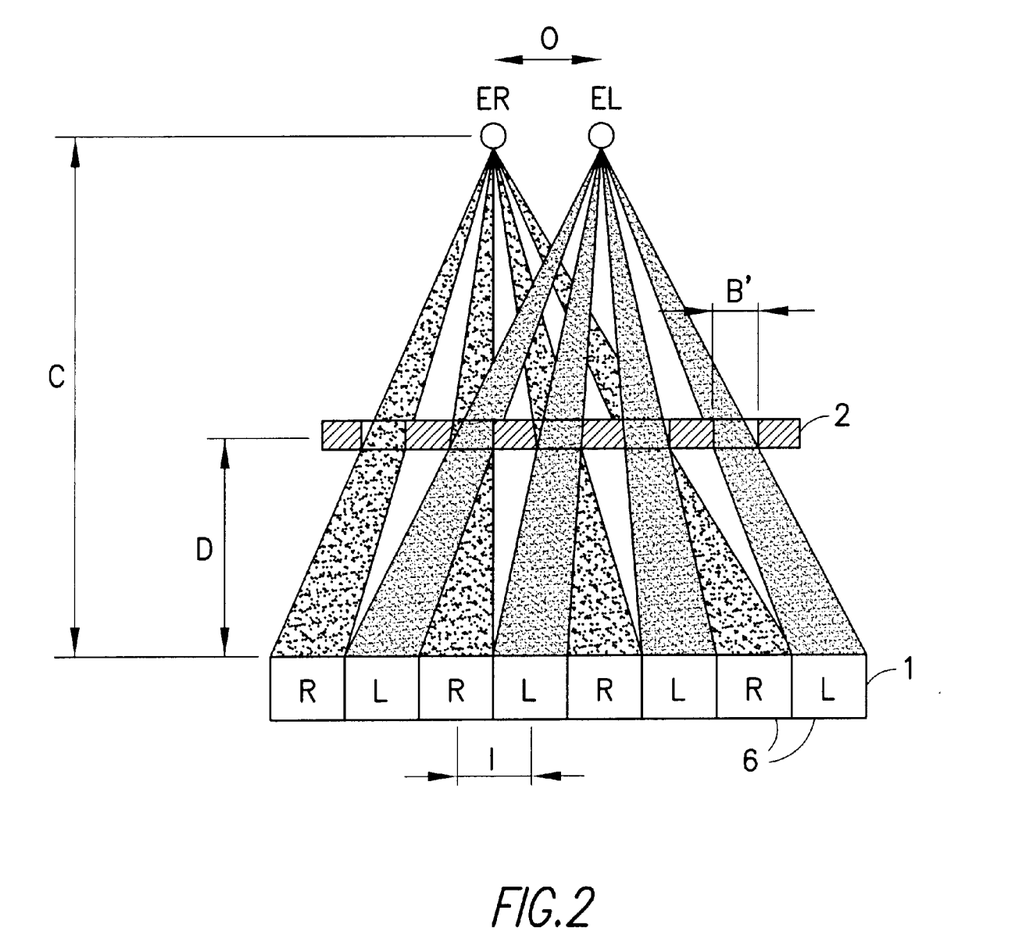
FIG. 2 is a view for explaining the operation of the stereoscopic image display apparatus of the present invention.

FIG. 2 is a schematic view for explaining stereoscopic viewing based on the parallax barrier method of the stereoscopic image display apparatus of the present invention. Let O be the interval between the two eyes of the observer, C be the observation distance, D be the interval between the LCD 1 and the parallax barrier 2, B' be the width of each aperture portion of the parallax barrier, and I be the image interval of stripe image portions displayed on the LCD 1. Then, these parameters satisfy the following relations:

$$D = I \cdot C / (O + I) \tag{1}$$

$$B' = I \cdot (C - D) / C \tag{2}$$

Note that the observation width has a finite divergence at the observation position in practice, and these quantities are set after they are slightly modified. These relationships have been described in detail in S. H. Kaplan, "Theory of Parallax Barriers", J. SMPTE, Vol. 59, No. 7, pp. 11–21 (1952).

In this embodiment, the display 1 comprises a 10.4" color LCD, and has 800 (horizontal)×600 (vertical) pixels as in an SVGA. The layout of color filters is an RGB stripe layout, and this stripe layout forms one pixel. The size of one pixel is 0.264 mm (horizontal)×0.264 mm (vertical), i.e., each pixel is a square one. Since the stripe width of each parallax image is set to equal that of one pixel, the image interval is I=0.264 mm. Also, since the base length is set to be O=62 mm and the observation distance is set to be C=560 mm, the interval between the LCD and the parallax barrier is set to be D=2.12 mm, and the aperture slit width of the parallax barrier is set to be B'=0.263 mm. These quantities are slightly adjusted in consideration of a finite divergence of the observation width.

The operation of the stereoscopic image display apparatus of the present invention will be described below with reference to FIGS. 1 and 2. Referring to FIG. 1, at least two parallax images input to the terminal 10 are divided into stripe patterns by the striping circuit 8, and the stripe patterns of the two parallax images are alternately synthesized in the order of R, L, R , L, . . . , thus generating a single stripe synthesized image. This image data is input to the LCD driver 7, and the stripe synthesized image 6 is displayed.

As shown in FIG. 2, the right eye ER observes a group of light rays from the parallax image portions R for the right eye via the aperture slit width B' of the barrier 2. The left eye EL observes a group of light rays from the parallax image portions L for the left eye via the aperture slit width B' as in the right eye ER. In this manner, the right and left parallax image portions which are independently guided to the right and left eyes ER and EL are synthesized and combined by the retinas and the subsequent organs of the eyes, thus allowing to observe a stereoscopic image.

Referring to FIG. 1, the backlight 5 turned on by the backlight driver 9 serves as a scattering surface light source, and the illumination prism sheet 4 (disclosed in, e.g., Japanese Patent Application Laid-Open No. 2-84618) adjusts only the orientation characteristics, in a plane (in the plane of paper of FIG. 1) roughly including the arrangement direction of prisms of the sheet 4, of an illumination light beam emitted by the backlight 5, i.e., converts the light beam into an illumination light beam having a high directivity in only the plane including the arrangement direction of the prisms, although the light beam cannot become a perfectly collimated beam.

The illumination light beam becomes incident on the holographic diffraction element 3. The holographic diffraction element 3 has concentric grating patterns in its plane, and serves to converge the illumination light beam. Therefore, as shown in FIG. 1, light transmitted through the holographic diffraction element 3 is diffracted, and is split into 0th-, +1st-, and −1st-order diffracted light beams. These diffracted light beams are diffracted at different diffraction angles that satisfy the grating formula in correspondence with the pitch of the grating pattern on the holographic diffraction element 3, the incident angles, and the wavelengths. As a result, the 0th-order diffracted light beam is diffracted in directions represented by light rays indicated by the dotted lines, and converges roughly toward the point PO. Likewise, the +1st- and −1st-order diffracted light beams respectively converge roughly toward the points PL and PR. Such holographic diffraction element 3 can comprise either an amplitude or phase type element, and can be manufactured by a general holographic manufacturing method.

More specifically, since the −1st- and +1st-order diffracted light beams converge in the directions of the right and left eyes ER and EL, a relatively bright image can be provided as compared to the conventional parallax barrier display apparatus.

Since the prism sheet 3 improves the directivity of the light beam, the respective diffracted light beams have good convergence in the plane of paper in FIG. 1, and are so sufficiently separated at the imaginary focal points P0, PL, and PR as to make crosstalk generated negligible. Although the respective diffracted light beams still have a large beam size in the space where the right and left eyes ER and EL are located, the −1st- and +1st-order diffracted light beams are separated enough so one can ignore crosstalk.

Note that FIG. 1 illustrates representative light rays, and may appear as if an illumination light beam converged at one imaginary focal point. However, as can be apparent from the above description, the illumination light is originally emitted by the scattering surface light source 5 which is spatially sufficiently coherent, high-directivity conversion by the prism sheet 4 is bound within this limit, and the converted light beam cannot perfectly converge at one point. Therefore, with only the respective light rays illustrated in FIG. 1, it may seem that light in the NA or equivalence defined by light rays (dotted lines) of the illumination light cannot sufficiently cover the range of the NA defined by light rays (solid lines) that become incident on the right and left eyes. However, for the above-mentioned reason, a sufficient amount of light rays are supplied to become incident on the right and left eyes.

In the case of the conventional parallax barrier display apparatus which has no holographic diffraction element 3, since an illumination light beam has no directivity, illumination light beams having information of right and left images respectively reach the geometrically defined crosstalk region of the right and left eye, and actually generate crosstalk. However, in the present invention, the illumination light has directivity, and light beams can be concentrated at positions in the vicinities of the viewing regions of the right and left eyes. For this reason, even in a crosstalk region, no crosstalk is generated since one illumination light beam cannot reach there.

As described above, according to the present invention, since not only the brightness but also the degree of separation of light beams for the right and left eyes are improved, crosstalk can be greatly eliminated. That is, since crosstalk does not increase even when a certain light beam width is assured in the vicinity of the observation viewing region, the viewing region can be broadened.

(Second Embodiment)

Figure 3:
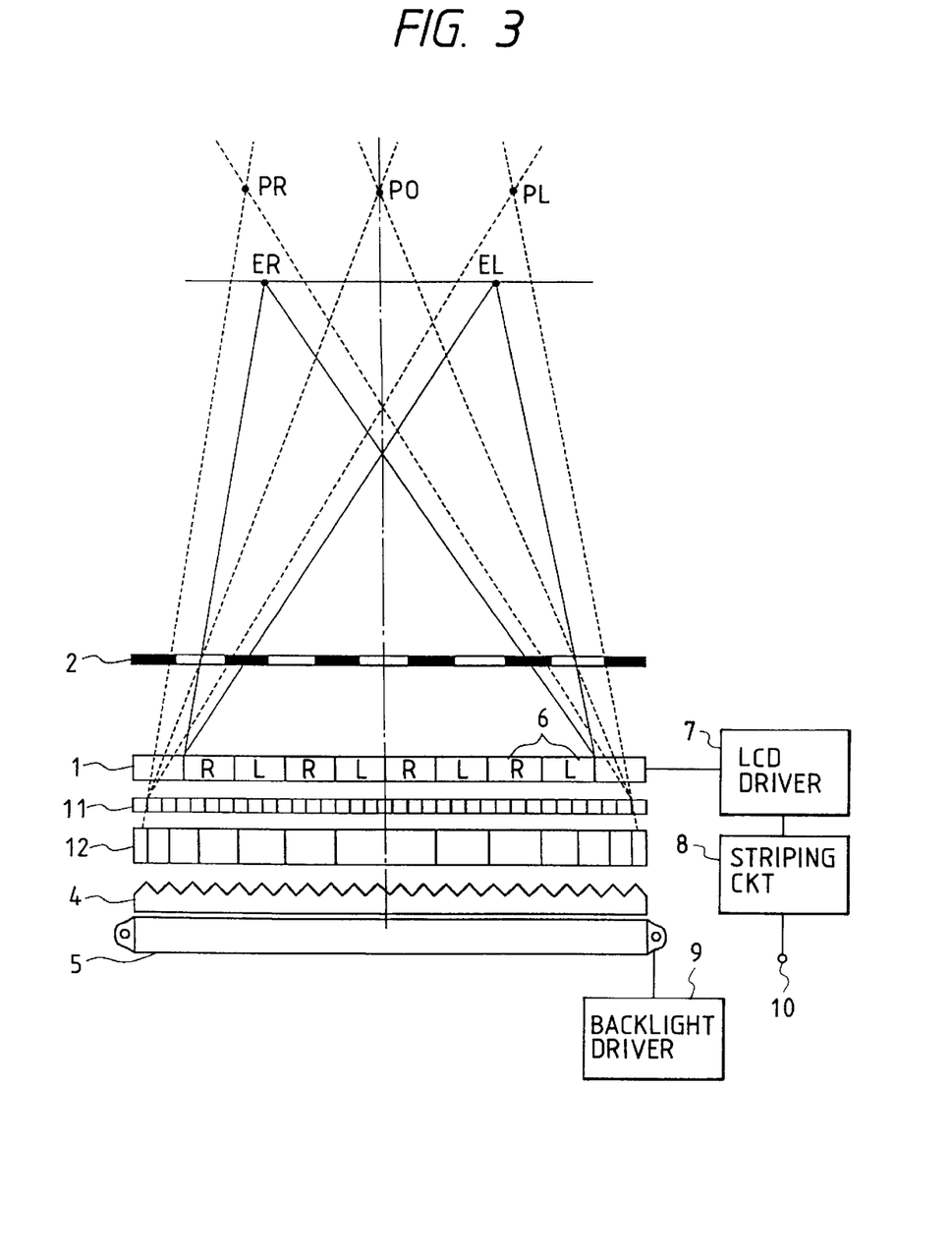
FIG. 3 is a schematic diagram showing a stereoscopic image display apparatus according to the second embodiment of the present invention.

FIG. 3 is a schematic diagram showing a stereoscopic image display apparatus according to the second embodiment of the present invention. The same reference numerals in FIG. 3 denote the same parts as in the first embodiment shown in FIG. 1. The apparatus of this embodiment comprises a diffraction grating 11 having a linear pattern, and a Fresnel lens 12 in place of the element 3. Note that solid lines indicating light rays that reach the two eyes ER and EL via the parallax barrier 2 are illustrated from only the two ends of the screen so as to avoid a complicated illustration on the drawing.

Referring to FIG. 3, scattered light from the backlight 5 is given high directivity in the arrangement direction of the prisms by the prism sheet 4 and is converted into convergent light by the Fresnel lens 12. Furthermore, the convergent light is separated into 0th-, +1st-, and −1st-order diffracted light beams by the diffraction grating 11. The diffraction grating 11 has a linear pattern, and the arrangement direction of the pattern agrees with the linear arrangement direction of the stripe image 6 and the barrier 2. Therefore, of light beams which are converted into convergent light by the Fresnel lens 12 and are diffracted by the diffraction grating 11, as shown in FIG. 3, the 0th-order diffracted light beam roughly converges at the point PO, the +1st-order diffracted light beam roughly converges at the point PL, and the −1st-order diffracted light beam roughly converges at the point PR.

With this arrangement, the same effect as in the first embodiment can be realized. The advantage of this embodiment lies in that the elements can be manufactured easier than in the first embodiment. When the display size of the LCD 1 is as large as 10' or more, it is difficult to manufacture a holographic diffraction element 3 with this size, resulting in high manufacturing cost. However, in this embodiment, although two parts, i.e., the linear diffraction grating 11 and the Fresnel lens 12 must be arranged, they can be manufactured to have any size, resulting in an advantage in terms of cost.

In this embodiment as well, the diffraction grating 11 can comprise either an amplitude or phase type element, and can be manufactured by pattern deposition of, e.g., aluminum, resin molding, and the like. However, in consideration of diffraction efficiency including transmittance, the phase type element is preferably used in this embodiment since two parts must be used. As the Fresnel lens 12, a phase type element is preferable rather than an amplitude type element in terms of transmittance. Also, in terms of performance, a Gabor zone plate is preferably used as compared to a Fresnel zone plate. However, in consideration of easy manufacture, a resin-molded Fresnel lens on which the diffraction angles of concentrically arranged prisms are changed stepwise is most preferable.

Note that the present invention can be practiced when the positions of the diffraction grating 11 and the Fresnel lens 12 are changed to replace each other.

As described above, according to the present invention, an improved brightness and a broader viewing region can be realized with low cost as a result of elimination of crosstalk even in a large-size stereoscopic image display apparatus.

(Third Embodiment)

Figure 4:
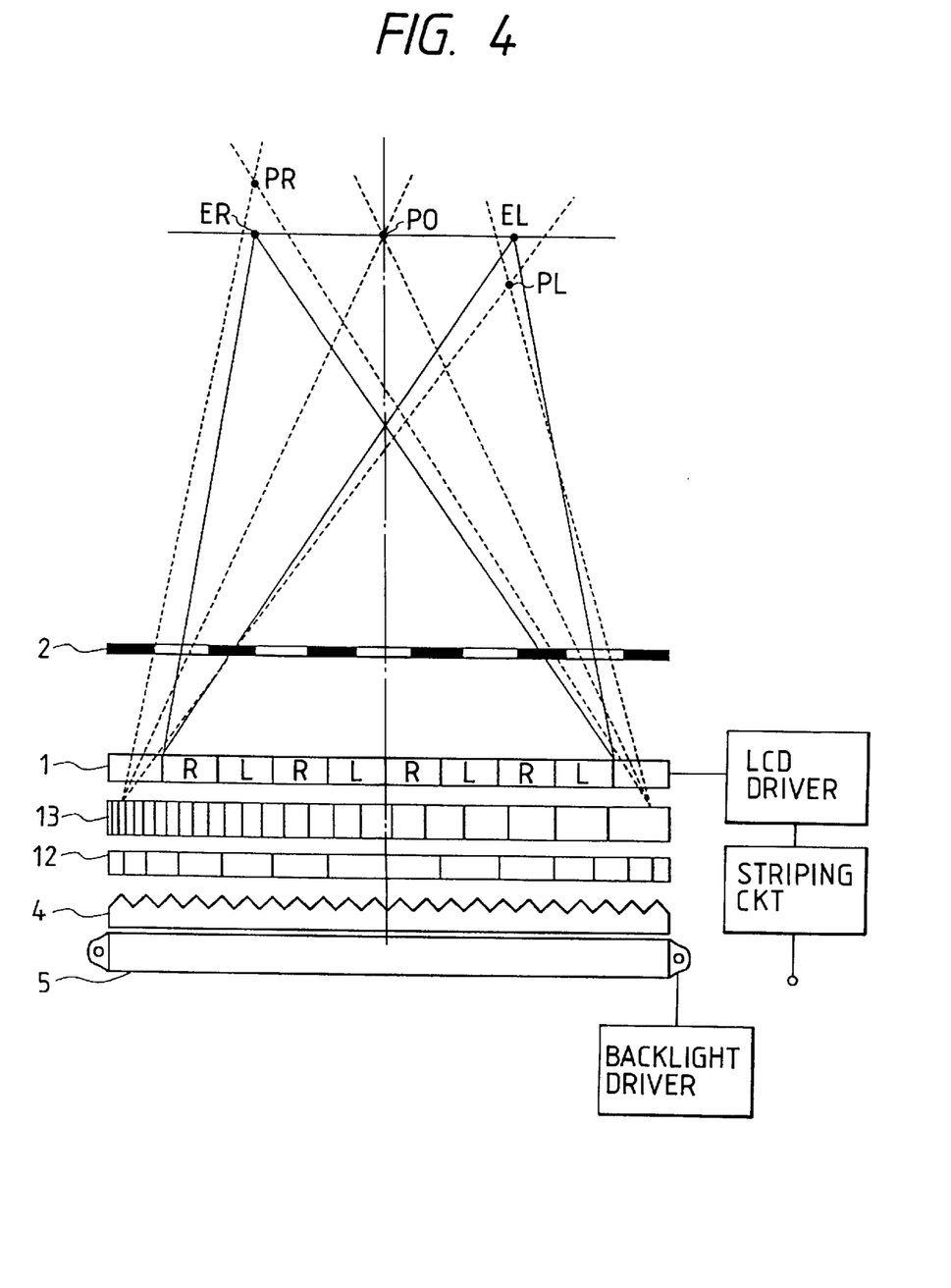
FIG. 4 is a schematic diagram showing a stereoscopic image display apparatus according to the third embodiment of the present invention.

FIG. 4 is a schematic diagram showing a stereoscopic image display apparatus according to the third embodiment of the present invention. The same reference numerals in FIG. 4 denote the same parts as in the second embodiment shown in FIG. 3. The Fresnel lens 12 is the same as that in the second embodiment, and a parallelly decentered diffraction element 13 is arranged in place of the diffraction grating 11.

Referring to FIG. 4, scattered light from the backlight 5 is given high directivity in the arrangement direction of the prisms by the prism sheet 4 and is converted into convergent light by the Fresnel lens 12. Furthermore, the convergent light is separated by the diffraction element 13 on which concentric grating patterns, the center of which is decentered with respect to the optical axis of the Fresnel lens, are formed, and the separated light beams respectively converge and diverge.

Figure 5:
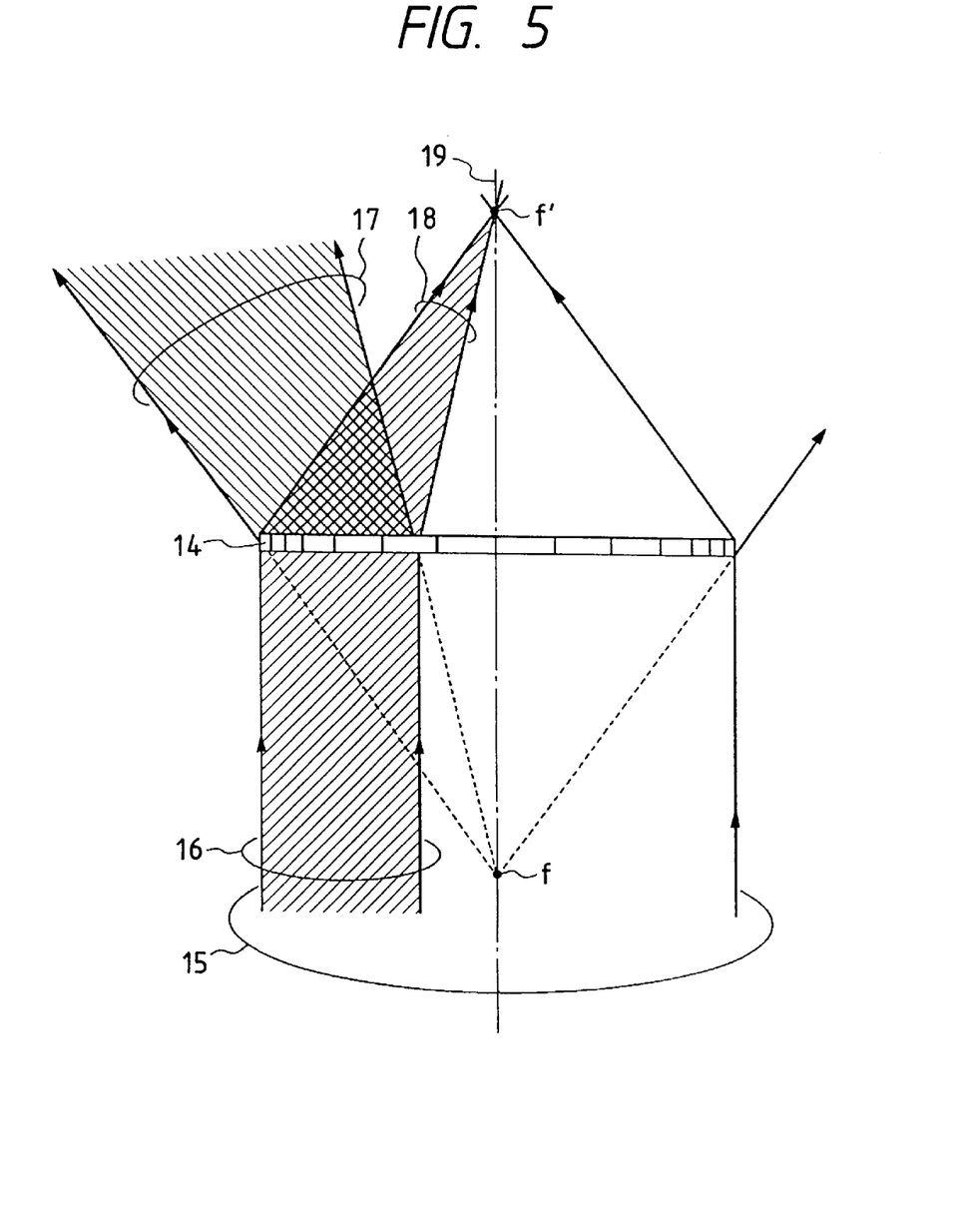
FIG. 5 is a view for explaining the directions of light rays in the stereoscopic image display apparatus of the present invention.

FIG. 5 is a view for explaining the operation of the parallelly decentered diffraction element 13. Referring to FIG. 5, a collimated light beam 15 incident on a diffraction element 14 formed with concentric grating patterns forms a real image at the position of a focal length f' on the optical axis, and forms a virtual image at the position of a focal length f on the opposite side. Therefore, convergent light 18 and divergent light 17 are obtained from a parallelly decentered collimated light beam 16. This embodiment uses these two light beams indicated by hatched portions.

Referring to FIG. 4, a light beam which is to be imaginarily converged at the point PO by the coaxial Fresnel lens 12 is separated into two light beams which are slightly diverged and converged by the parallelly decentered diffraction grating 13. Therefore, the focusing positions of the respective light rays slightly shift in the direction perpendicular to the LCD 1 like PR and PL to sandwich the point PO therebetween. In this manner, since other light rays are focused at the central position PO in a region where the right and left eyes ER and EL are located, crosstalk can be greatly eliminated as compared to the above embodiments.

Therefore, according to this embodiment, crosstalk from other light rays can be greatly eliminated while assuring illumination regions for the right and left eyes equivalent to those in the above embodiments. Accordingly, the viewing regions of the right and left eyes can be broadened.

In this embodiment, right- and left-eye images may have different brightness levels due to efficiency unbalance between divergent light and convergent light from the parallelly decentered diffraction element 13, and convergence and divergence of illumination light beams at the view points of the right and left eyes.

Note that the present invention can be practiced when the positions of the two elements 12 and 13 having lens effects are changed to replace each other.

As described above, according to the present invention, an improved brightness and a broader viewing region can be realized with low cost as a result of great elimination of crosstalk in a stereoscopic image display apparatus.

What is claimed is:

1. A stereoscopic image display apparatus comprising:
   a two-dimensionally array of light modulation elements for modulating light in correspondence with a stripe synthesized image obtained by alternately arranging stripe image portions of a plurality of stripe images which are obtained by dividing right- and left-eye images;
   an illumination light source, arranged behind said light modulation elements, for illuminating said light modulation element;
   a parallax barrier arranged in front of said light modulation elements, and having predetermined aperture portions and light-shielding portions in correspondence with said light modulation elements corresponding to the respective stripe image portions; and
   an optical element disposed between said illumination light source and said light modulation element, said optical element dividing and deflecting light from said illumination light source for two directions so that directivities for directions for each of left and right eyes are provided for said light, said optical element includes diffraction means, wherein one of ±1st-order diffracted lights from said diffraction means is directed to one of the left and right eyes and the other of the ±1st-order diffracted lights from said diffraction means is directed to the other of the left and right eyes.

2. An apparatus according to claim 1, further comprising a linearly array of prisms, located between said illumination light source and said light modulation elements, for improving directivity of the light emitted by said illumination light source.

3. An apparatus according to claim 1, wherein said light dividing and deflecting element has an effect of converging divided and deflected light beams.

4. An apparatus according to claim 1, wherein said light dividing and deflecting element comprises a diffraction element having concentric grating patterns.

5. An apparatus according to claim 1, further comprising a Fresnel lens located between said illumination light source and said light modulation elements.

6. An apparatus according to claim 5, wherein said light dividing and deflecting element comprises a linear diffraction grating which is arranged in a direction parallel to said parallax barrier.

7. An apparatus according to claim 5, wherein said light dividing and deflecting element comprises a diffraction element having concentric grating patterns, a center of which is decentered with respect to an optical axis of said Fresnel lens.

8. An apparatus according to claim 1, wherein said light for which said directivities for directions for each of left and right eyes have been provided, finally goes toward an observer as a converged light beam.

* * * * *

UNITED STATES PATENT AND TRADEMARK OFFICE
CERTIFICATE OF CORRECTION

PATENT NO. : 5,943,166  Page 1 of 1
DATED : August 24, 1999
INVENTOR(S) : Hiroaki Hoshi et al.

It is certified that error appears in the above-identified patent and that said Letters Patent is hereby corrected as shown below:

<u>Title page,</u>
Item [54], References Cited, U.S. PATENT DOCUMENTS, please insert the following:
-- 5,521,724   5/1996   Shires            359/15
   3,101,644   8/1963   Lopez-Henriquez   359/463 --

Please delete "5,476,417 12/1995" and insert therefor -- 5,467,417 11/1995 --.

Signed and Sealed this

Twenty-fifth Day of June, 2002

*Attest:*

JAMES E. ROGAN
*Attesting Officer*     *Director of the United States Patent and Trademark Office*